US009779336B2

(12) United States Patent
Wierda et al.

(10) Patent No.: US 9,779,336 B2
(45) Date of Patent: Oct. 3, 2017

(54) METHOD FOR SCHEDULING OPERATOR ACTIONS FOR A PRINT-WHILE-RIP JOB AND A PRINT SYSTEM

(71) Applicant: Océ-Technologies B.V., Venlo (NL)

(72) Inventors: Klaas Jan Wierda, Venlo (NL); Abraham Thijssen, Venlo (NL)

(73) Assignee: OCÉ-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 15/388,028

(22) Filed: Dec. 22, 2016

(65) Prior Publication Data

US 2017/0185876 A1    Jun. 29, 2017

(30) Foreign Application Priority Data

Dec. 23, 2015  (EP) .................................... 15202320

(51) Int. Cl.
*G06K 15/02* (2006.01)
*G06K 15/00* (2006.01)

(52) U.S. Cl.
CPC ....... *G06K 15/1823* (2013.01); *G06K 15/005* (2013.01); *G06K 15/1809* (2013.01); *G06K 15/1817* (2013.01); *G06K 15/1836* (2013.01); *G06K 15/1863* (2013.01); *G06K 2215/0077* (2013.01)

(58) Field of Classification Search
CPC .......................... G06K 15/1823; G06K 15/005
See application file for complete search history.

(56) References Cited

U.S. PATENT DOCUMENTS

| 2014/0268216 A1* | 9/2014 | Soriano | G06K 15/1803 358/1.15 |
| 2014/0368866 A1 | 12/2014 | Kikumoto | |
| 2014/0368873 A1 | 12/2014 | Fukuda | |
| 2016/0139859 A1* | 5/2016 | Nagata | G06F 3/124 358/1.15 |

FOREIGN PATENT DOCUMENTS

| EP | 0 889 391 A1 | 1/1999 |
| EP | 2 431 861 A2 | 3/2012 |

* cited by examiner

*Primary Examiner* — Ibrahim Siddo
(74) *Attorney, Agent, or Firm* — Birch, Stewart, Kolasch & Birch, LLP (57) ABSTRACT

A method for scheduling operator actions for a print job to be printed in a print-while-rip mode includes assuming at least one part of a print job duration which is unknown due to missing information, establishing at least one operator action during the at least one second part of the print job duration based on a first part of the print job duration, displaying a time bar for the print job on the user interface, the time bar starting from the established start time and including a first time bar part corresponding to and proportional to the first part of the print job duration and at least one second time bar part corresponding to the at least one second part of the print job duration, and for each established operation action, displaying a digital object representing the operator action at the corresponding moment in time on the second time bar part.

16 Claims, 6 Drawing Sheets

METHOD FOR SCHEDULING OPERATOR ACTIONS FOR A PRINT-WHILE-RIP JOB AND A PRINT SYSTEM

CROSS-REFERENCE TO RELATED APPLICATIONS

This application claims priority under 35 U.S.C. §119(a) to Application No. 15202320.6, filed in Europe on Dec. 23, 2015, the entire contents of which is hereby incorporated by reference into the present application.

BACKGROUND OF THE PRESENT INVENTION

1. Field of the Invention

The present invention relates to a method for scheduling operator actions for a print job to be printed in a print-while-rip mode by a printing system, the printing system comprising a user interface and a controller for scheduling the print job in time, the print job not yet received completely by the printing system and having a plurality of known print job properties and missing information that is essential for an accurate print job duration calculation of the print job, the method comprising the steps of receiving the print job at least partially in a print buffer of the printing system, determining a first part of the print job duration, the first part of the print job duration being guaranteed to be consumed based on the plurality of known print job properties of the print job and based on the at least partially received print job, and establishing a start time of the print job.

2. Description of Background Art

Nowadays, a print job schedule for scheduling print jobs in a printing system shows predicted media usage and output destination status based on the known print job information, like print job properties and print system parameters, like print speed. However, in case of a print job to be printed in a print-while-rip mode part of the print job, some information is unknown. A first part of the print job received in the print buffer in the controller can be used to determine a definite first part of the print job duration based on the plurality of known print job properties and the data block in the buffer. A start time of the print job can be established and scheduled. An operator can be sure that printing can continue the coming first part of the print job duration.

A data block or block of data, sometimes called a physical record, is defined as a sequence of bytes or bits, usually containing some whole number of records, having a maximum length, a block size.

An example of a print-while-rip mode, sometimes equivalently called a rip-while-print mode, is a print job that is first delivered at a raster image processor, which can only rasterize blocks of data of the print job one after each other before the ripped data block is transferred to a print buffer in the controller of the printing system. The rasterizing image processor may be external to the printing system or may be incorporated in the printing system, for example in the controller of the printing system.

Another example of printing in a print-while-rip mode is a streaming print mode. In a streaming print mode, a print job is divided into limited blocks of data and one block after another is transmitted to the controller of the printing system. The controller is only aware of the number of pages of the current block and is not informed about the total number of blocks of the print job to be processed.

A typical streaming print mode is transaction printing. Transaction print jobs are different from 'publishing' print jobs in that the controller does not know when the print job will end after it starts. A transactional print job may involve a hundred, a thousand, or a few million prints. Many digital printing system's controllers are designed to ingest the entire job, arrange its resources according to the size of the print job and then begin printing the print job last page first so that what is produced is a 'book' with the user seeing the first page first. This 'publishing' model obviously does not work for 'transaction' printing. Therefore, a controller using a different internal model for print jobs is used for transaction printing.

Since part of a print-while-rip job is unknown to the controller, a planning of future operator actions is nowadays difficult, since the end of the print job is not shown to the operator.

SUMMARY OF THE PRESENT INVENTION

An object of the present invention is to provide a method for scheduling operator actions during printing of a print-while-rip print job. Another object is to provide a print system in which the method is implemented.

For this purpose, a method according to the present invention comprises the steps of assuming at least one second part of the print job duration, the at least one second part of the print job duration being unknown due to the missing information, establishing at least one operator action at the printing system during the at least one second part of the print job duration based on the first part of the print job duration, displaying a time bar for the print job on the user interface, the time bar starting from the established start time and comprising a first time bar part corresponding to and proportional to the first part of the print job duration and at least one second time bar part corresponding to the at least one second part of the print job duration, and for each established operator action, displaying a digital object representing the operator action at the corresponding moment in time on the at least one second time bar part.

By doing so, the method according to the invention shows assumptions based on modeling an expected behavior of the print job based on the available print job information.

According to an embodiment, the method comprises the steps of receiving at least a part of the missing information, adapting the assumed at least one second part of the print job duration and adapting the display of the at least one second time bar part. Since the information of the upcoming print job is unknown for the at least one second part, the assumption made for the second part may be completely wrong. However, the assumption is updated as new information about the print job comes in, for example, when a new block of data is read into the buffer of the controller. The display of the at least one second part is also updated to conform to the updated assumption. When new information about the print job comes in, the first part of the print job duration may also be updated, since the known part of the print job duration may increase.

According to an embodiment of the method, the step of receiving at least part of the missing information comprises the sub-steps of receiving a new part of the print job in the print buffer and deriving at least part of the missing information from the received new part. Each time the print buffer is reloaded with additional print data of the print job, the missing information diminishes and the print job knowledge known to the controller increases.

According to an embodiment of the method, the missing information comprises at least one of a type of a consumable needed for the print job like print media, marking material, finishing material, output destinations of the printing system, a total number of pages of the print job, a total number of blocks of data of the print job and a total number of bytes of the print job.

According to an embodiment, the method comprises the steps of assuming a second part of the print job duration for each medium type used earlier in the print job, and for each medium used earlier in the print job, displaying on the user interface the same first time bar and a second time bar part, the second time bar part corresponding to the assumed second part of the print job duration for the medium type. It is assumed that any medium type may be used continuously that was used earlier in the print job. A schedule of the print jobs shows time bars for these medium types based on the full usage of these medium types.

According to an embodiment, the method comprises the steps of assuming a second part of the print job duration for each output destination used earlier in the print job, and for each output destination used earlier in the print job, displaying on the user interface the same first time bar and a second time bar part, the second time bar part corresponding to the assumed second part of the print job duration for the output destination. It is assumed that any output destination may be used continuously that was used earlier in the print job. A schedule of the print jobs shows time bars for these output destinations based on the full usage of these output destinations. This is advantageous when a print job has already assigned printed data to more than one output destination of the printing system.

According to an embodiment, the method comprises the steps of assuming a second part of the print job duration for each medium type used in earlier printed print jobs, and for each medium used in earlier printed print jobs, displaying on the user interface the same first time bar and a second time bar part, the second time bar part corresponding to the assumed second part of the print job duration for the medium type.

According to an embodiment, the method comprises the steps of assuming a second part of the print job duration for each medium type present in media input holders of the printing system, and for each medium type present in the media input holders, displaying on the user interface the same first time bar and a second time bar part, the second time bar part corresponding to the assumed second part of the print job duration for the medium type.

According to an embodiment of the method, the step of assuming the at least one second part of the print job duration comprises the step of assuming the at least one second part of the print job duration to be equal to a time period that is to the utmost displayable on a window of the user interface.

According to an alternative embodiment, the printing system uses a printing system setting for setting a history time-frame and the assuming step is only based on information assumed for the period in the set history time-frame.

According to an embodiment, the method comprises the steps of calculating a running average of use of a medium type and a running average of use of an output destination, and, when the running average of a medium type is lower than a first predetermined value, hiding a display of said medium type, and, when the running average of an output destination is lower than a second predetermined value, hiding a display of said output destination.

According to an embodiment, the operator action is a refilling action for the consumable for the printing system and the operator action representing a digital object is a digital object representing the refilling action.

According to an embodiment, the operator action is an emptying action to empty a consumable holder for the consumable of the printing system and the operator action representing a digital object is a digital object representing the emptying action.

According to an embodiment, the print job is one out of a print-while-rip job, a rip-while-print job, a streaming print job and a transaction print job.

According to an embodiment, the first time bar part is visually distinguishable from the at least one second time bar part. For example, the at least one second time bar part is water colored showing that the information represented by the at least one second time bar part is uncertain.

The present invention also relates to a printing system for printing a print job in a print-while-rip mode, the printing system comprising a user interface and a controller for scheduling the print job in time, the print job not yet received completely by the printing system and having a plurality of known print job properties and missing information that is essential for an accurate print job duration calculation of the print job, wherein the controller is configured to execute the steps of the method according to the invention.

According to an embodiment of the printing system, the controller of the printing system is configured to select a streaming printing mode.

The present invention also relates to a non-transitory computer readable medium comprising computer executable program code configured to instruct a computer to perform the method according to the invention.

Further scope of applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMEMTS

The present invention will now be described with reference to the accompanying drawings, wherein the same reference numerals have been used to identify the same or similar elements throughout the several views.

Figure 1:
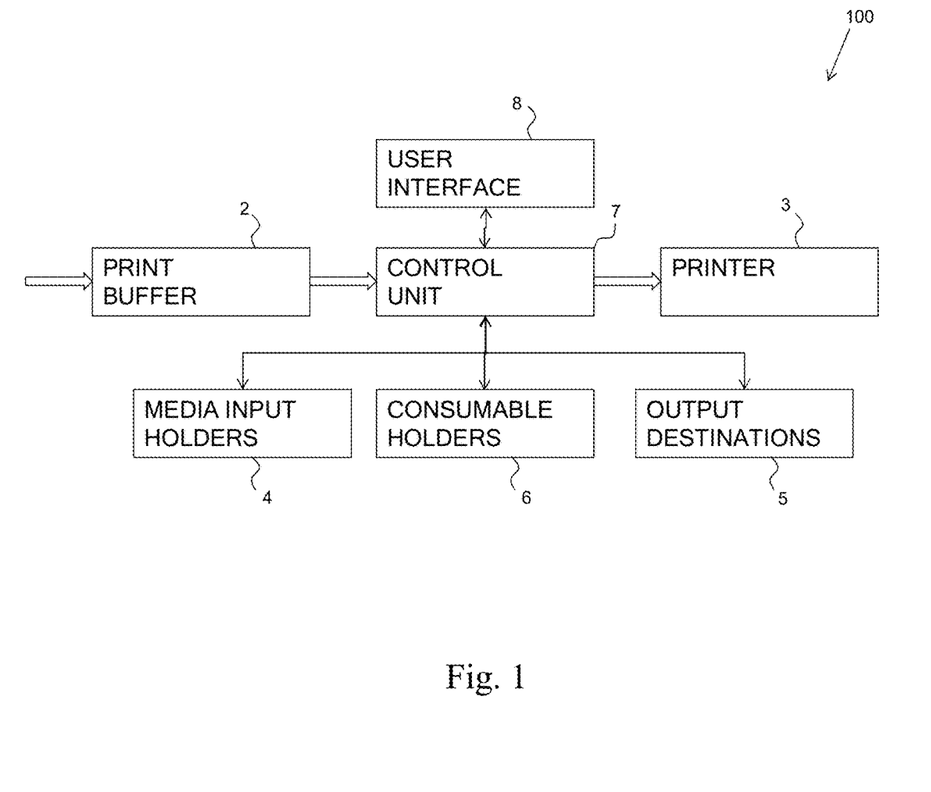
FIG. 1 illustrates the general arrangement of the printing system according to the invention.

FIG. 1 illustrates the general arrangement of a printing system 100 according to the invention. The printing system 100 comprises a print buffer 2 for feeding image information from an external source to the printing system 100 and a print engine or printer 3 for printing digital image information on a receiving material. The print buffer 2 is configured to receive data of a print job with a print job ticket comprising a plurality of print job settings. The print buffer 2 is connected to a controller 7 which controls the storage of image information and the printing process of the print engine 3. The controller 7 is connected to the print engine 3. The print buffer 2 and the print engine 3 are connected to a controller or control unit 7, which is also connected to a user interface 8, which may comprise an operator controller provided with an operator control panel with operator control elements and a display element, for example an LCD screen in the form of a touch screen for use by an operator at the printing system 100. The operator control panel may be remotely wirelessly connected to the printing system 100, for example a mobile device. The user interface 8 gathers information from the controller 7 in order to display the gathered information at the operator control panel. The controller 7 comprises a storage for a plurality of printing system settings. The printing system settings determine a pre-printing process, like a ripping process of a print job, a print process by the print engine 3, and a post-printing process like an inline finishing step.

An external raster image processor (RIP) may be connected to the printing system 100 in order to rip an incoming print job externally and submit blocks of ripped data one by one to the print buffer 2 of the printing system 100.

The printing system 100 also comprises media input holders 4, consumable holders 6 and output destinations 5. The media input holders 4, consumable holders 6 and output destinations 5 are connected to the controller 7 for exchanging information and commands. Information or commands regarding a load of the holders 4, 5, 6 obtained via sensors in the holders may be submitted to the controller 7. The controller 7 may derive media input holders 4, consumable holders 6 and output destinations 5 to be activated from the print job specifications and may submit commands regarding activation of the holders 4, 5, 6 towards the holders 4, 5, 6.

Figure 2:
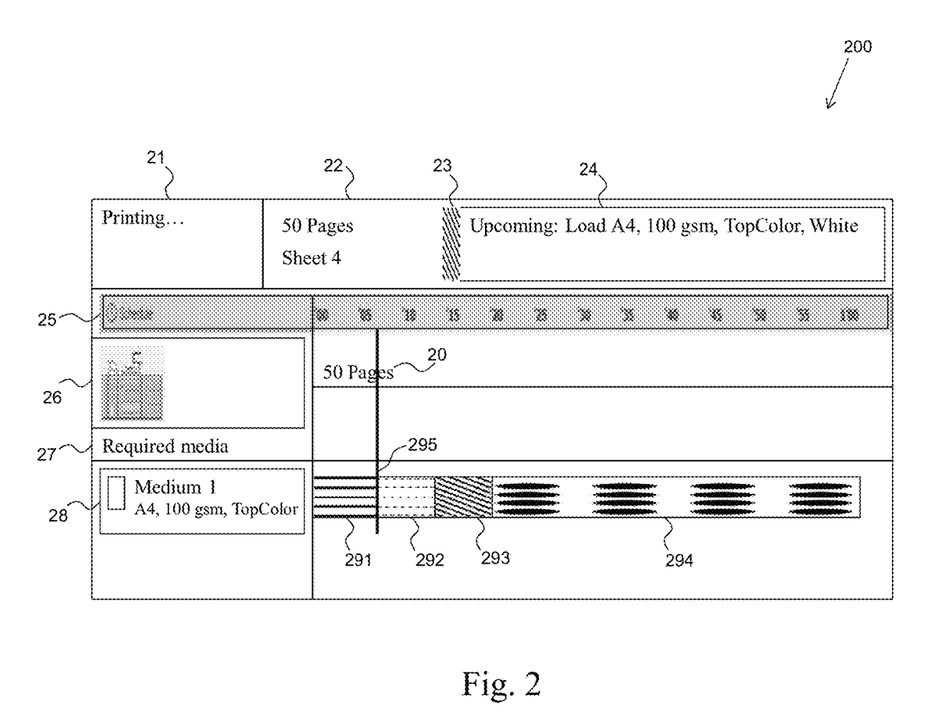
FIGS. 2-4 illustrate examples of media schedule windows on a user interface according to the invention.

FIG. 2 shown a media schedule window 200 according to the invention. A status field 21 of the printer 26 is showing that the printer 26 is currently "printing" a number of 50 pages, as shown in a content field 22 and below a time line 25 in a field 20. At the moment, sheet number four is printed. A message field 24 is displaying an upcoming operator action. A colored icon 23 shows the urgency of the upcoming operator action. The time line 25 of the media schedule is running from now up to one hour from now. A field 27 indicates a title for the required media for the next hour. A print medium 28 of A4, 100 gsm (gram per square meter), TopColor paper is required for the next hour. The time frame of one hour at time line 25 is a default, but other time frames may be envisioned.

Corresponding to the time line 25, a print medium line is shown to the right of the print medium 28. The print medium line consists of a first definite part 291 in a first color, preferably green, a second indefinite part 292 in the same first color, preferably water colored, a third indefinite part 293 in a second color, preferably orange or yellow, and a fourth indefinite part 294 in a third color, preferably red.

The first definite part 291 is the part of the print job duration that is surely established by the controller of the printing system. The print job is a print-while-rip job, for example a streaming print job. The first definite part 291 has a length of 7 minutes. The operator knows for sure that printing can continue for at least the next 7 minutes. The first definite part 291 may correspond to a first block of data of the print job, which has transferred to the memory of the controller of the printing system.

The second indefinite part 292, the third indefinite part 293 and the fourth indefinite part 294 form the assumed second part of the print job duration according to the method of the invention, which is unknown due to missing information, for example missing blocks of data. The indefinite parts 292, 293, 294 are related to the step of establishing at least one operator action at the printing system during the assumed second part 292, 293, 294 of the print job duration based on the first definite part 291 of the print job duration.

It is noted that the upcoming operator action in message field 24 in scheduled in advance in the indefinite second part 292, 293, 294 of the print job duration.

The total duration of the second indefinite part 292, the third indefinite part 293 and the fourth indefinite part 294, which forms the assumed second part of the print job duration according to the method of the invention, is equal to the total duration of the time line 25 in the user interface window 200. In a similar embodiment, the assumed second part of the print job duration according to the method of the invention is equal to a time period that is utmost displayable on the user interface window 200. In other words, the greatest amount of the assumed second part of the print job duration is displayable on the user interface window.

To indicate the difference between the first definite part 291 and the indefinite parts 292, 293, 294 a vertical line 295 is shown and touches the time line 25. Another difference between the first definite part 291 and the indefinite parts 292, 293, 294 is indicated by the kind of colors. While the first definite part 291 may have a saturated color, the indefinite parts 292, 293, 294 may each have a water colored color, respectively.

The second indefinite part 292 is based on the properties of the print medium 28, on the print velocity of the printing system, on the number of sheets loaded in an input holder of the printing system holding the print medium 28, and on the number of sheets in an output holder of the printing system. If the print job continues to be printed on this medium and transfers a second block of data of the print job to the memory of the controller of the printing system, no operator intervention is required during the second indefinite part 292. The color of the second indefinite part 292 is therefore the same as the color of the first definite part 291 (green), for example. Since sheets of the input holder will get exhausted at a moment in time being approximately 20 minutes from now, a warning for a required operator invention, i.e. loading the print medium 28 in the input holder, is indicated by the color orange of the third indefinite part 293, which is subsequent in time to the second indefinite part 292.

The fourth indefinite part 294 is based on the properties of the print medium 28, on the print velocity of the printing system, on the number of sheets loaded in an input holder of the printing system holding the print medium 28, and on the number of sheets in an output holder of the printing system. If the print job continues to be printed on this medium, an operator intervention is required during the fourth indefinite part 294. Since sheets of the input holder will get exhausted at a moment in time being approximately 20 minutes from now, a required operator invention, i.e. loading the print medium 28 in the input holder, is indicated by the color red of the fourth indefinite part 294, which is subsequent in time to the third indefinite part 293.

The operator action indicated by the third indefinite part 293 and the fourth indefinite part 294 is also shown in the message field 24 together with the color 23 of the third indefinite part 293 as a warning for the upcoming load of the print medium 28.

Figure 3:
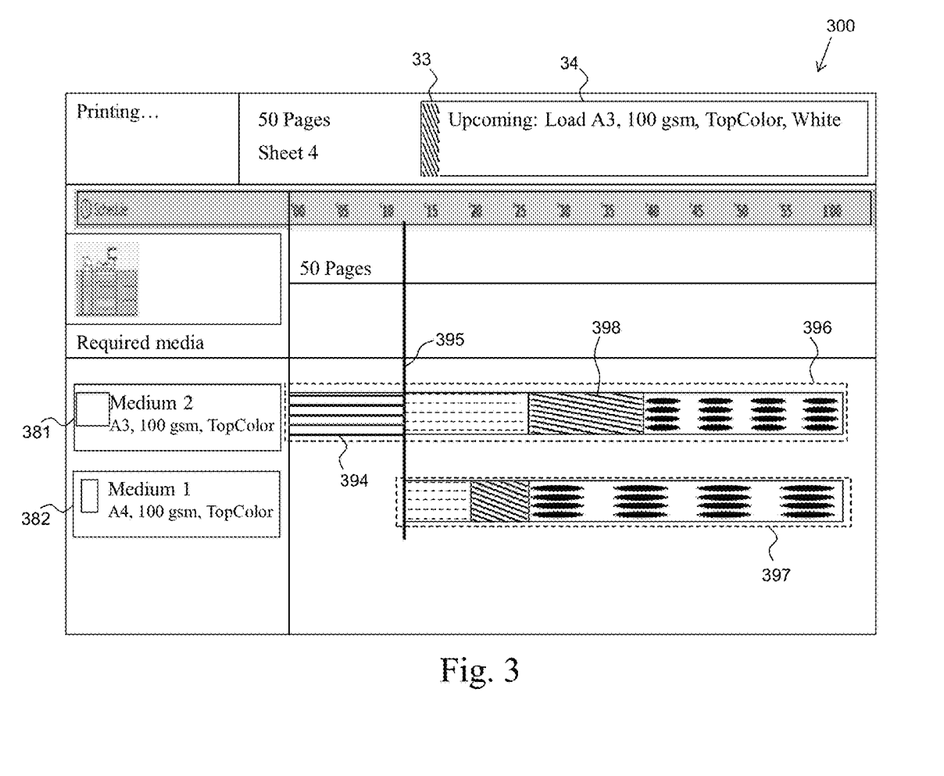

FIG. 3 shows a media schedule window 300 according to a further embodiment of the invention. Another print job is started on a first print medium 381 specified by a format size A3, a weight 100 gsm, and a print medium quality TopColor. A definite part 394 is scheduled in a first medium bar 396, succeeded by three indefinite parts as explained with FIG. 2. However, in a previous print job, another print medium 382 having a format size A4, a weight 100 gsm and a print medium quality TopColor has been used. The format size to be used is unknown for the indefinite part of the print job duration of the print job that is currently being printed. Therefore, for completeness, in addition to the first print medium bar 396, a second print medium bar 397 is also shown for the other print medium 382. Again, a vertical line 395 indicates the difference between the definite part 394 and the indefinite part of the first print medium bar 396 and the indefinite part 397 of the second print medium bar 397. The second print medium bar 397 starts at the vertical line 395, since it is certain that the printing system will use the first print medium 381 during the first definite part 394 of the print job duration and will not use the second print medium 382.

In a message field 34 together with a color 33 of an indefinite part 398, the upcoming operator event corresponding to the indefinite part 398 is shown as a warning for the upcoming load of the print medium 381.

A hypothetical, but not impossible upcoming operator event of loading the other print medium 382 is not yet shown in the message field 34. However, if during loading of new blocks of data of the print job, it is established that new pages of the print job have to be printed on a format size of A4, the message will be updated according to this new information. Also, the indications for the print media 381, 382 and the corresponding medium bars 396, 397 may be swapped in vertical direction and adapted accordingly for the definite part of the print job, the indefinite parts of the print job and a position of the vertical line 395.

Figure 4:
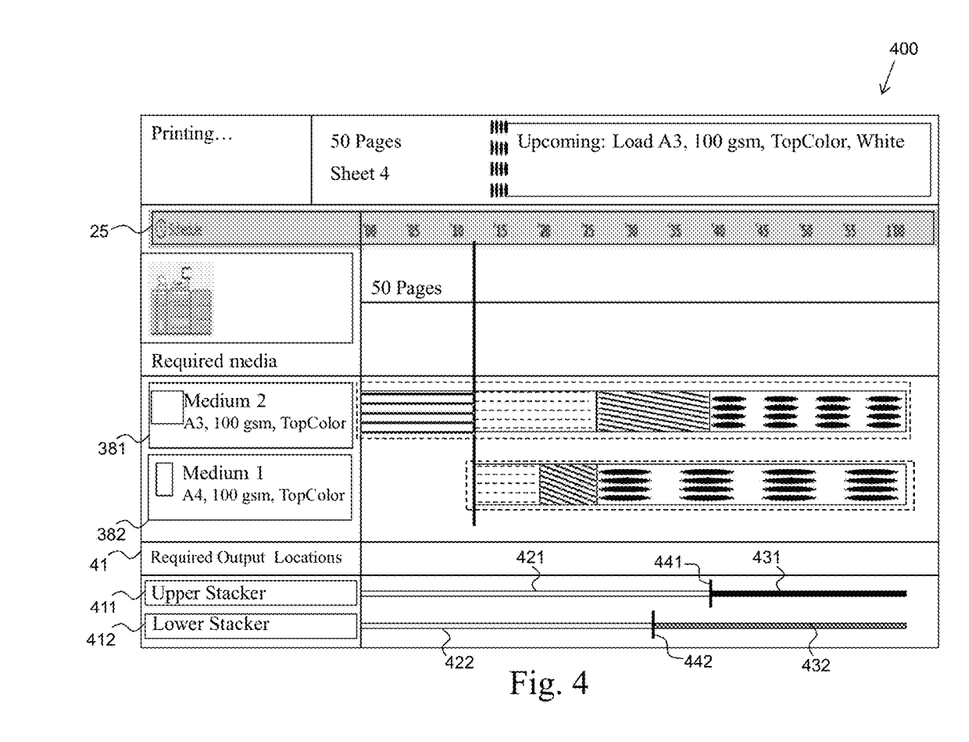

FIG. 4 shows a media schedule window 400 according to a further embodiment of the invention. The same print job is started on the first print medium 381, specified by a format size A3, a weight 100 gsm, and a print medium quality TopColor. A second print medium 382 is foreseen and specified by a format size of A4, a weight of 100 gsm and a print medium quality of TopColor.

A title 41 indicating "Required Output Locations" is positioned above an indication of a first output location 411, i.e. an upper stacker of the printing system, and an indication of a second output location 412, i.e. a lower stacker of the printing system.

Since the stackers 411, 412 have constraints for format sizes and for a number of sheets that can be deposited in the stacker, an output destination bar for the upper stacker comprises two parts, i.e. a first part 421, 422 for a trouble-free depositing of printed sheets and a second part 431, 432, which needs to be preceded by an unload of the stacker for the stackers 411, 412, respectively.

Vertical lines 441, 442 represent the moment in time of a foreseen operator intervention of unloading the stackers 411, 412, respectively. Since the vertical lines 441, 442 are positioned different with respect to the time bar 25, the moments in time of unloading the stackers 411, 412 are different, for example due to the capacity of the stackers 411, 412, or due to the number of sheets already deposited in the stackers 411, 412, respectively.

Both the upper stacker 411 and the lower stacker 412 may be used for depositing the printed sheets of print medium 381. However, depositing printed sheets of format size A3 in the upper stacker 411 and depositing printed sheets of format size A4 in the lower stacker 412 may be envisioned. In the latter case, the second indefinite part 432 of the medium bar corresponding to the lower stacker 412 may have a color deviating from the color of the second indefinite part 431 of the medium bar corresponding to the upper stacker 411.

Figure 5:
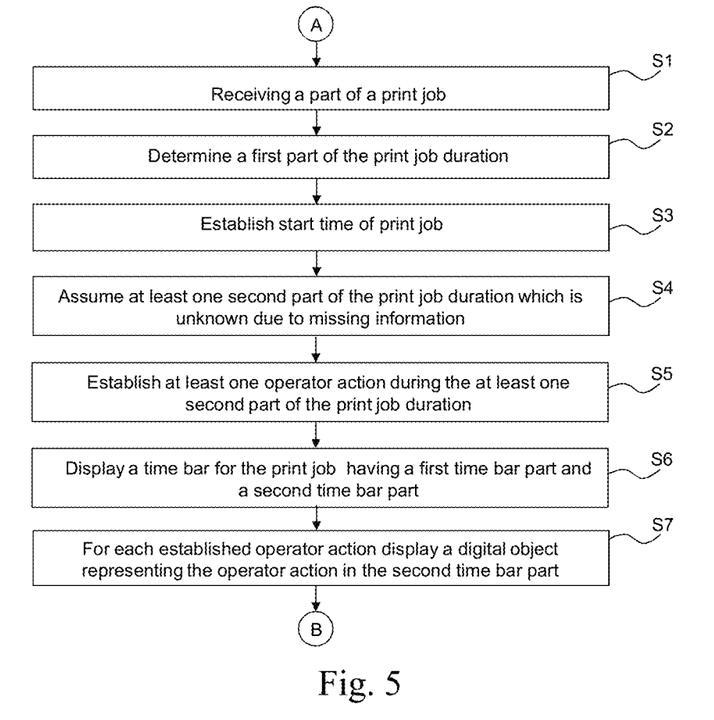
FIGS. 5-6 are flow diagrams of embodiments of the method according to the invention.

FIG. 5 is a flow diagram of an embodiment of the method according to the invention.

The method starts at a starting point A and proceeds to a first step S1.

In the first step S1, the print job is at least partially received in a print buffer of the printing system.

In a second step S2, a first part of the print job duration is determined, which is guaranteed to be consumed based on the plurality of known print job properties of the print job and based on the at least partially received print job.

In a third step S3, a start time of the print job is established.

In a fourth step S4, at least one second part of the print job duration is assumed, which is unknown due to the missing information.

In a fifth step S5, at least one operator action is established at the printing system during the at least one second part of the print job duration based on the first part of the print job duration.

In a sixth step S6, a time bar is displayed for the print job on the user interface. The time bar starts from the established start time and comprises a first time bar part corresponding to and proportional to the first part of the print job duration and at least one second time bar part corresponding to the at least one second part of the print job duration.

In a seventh step S7, a digital object representing the operator action at the corresponding moment in time on the second time bar part is displayed for each operator action established in the fifth step S5.

The method ends in end point B.

When at least a part of the missing information is received by the controller, for example by reading a next block of data, the assumed at least one second part of the print job duration is adapted and the display of the at least one second time bar part is also adapted. In other words, the steps S4-S7 are executed again. Moreover, for each receipt of new information of the print job, the steps S4-S7 are repeated until the print job is closed. The end of a streaming print job is, for example indicated by a specific character in the data stream indicating the end of the print job. This way of working is shown in FIG. 6.

Figure 6:
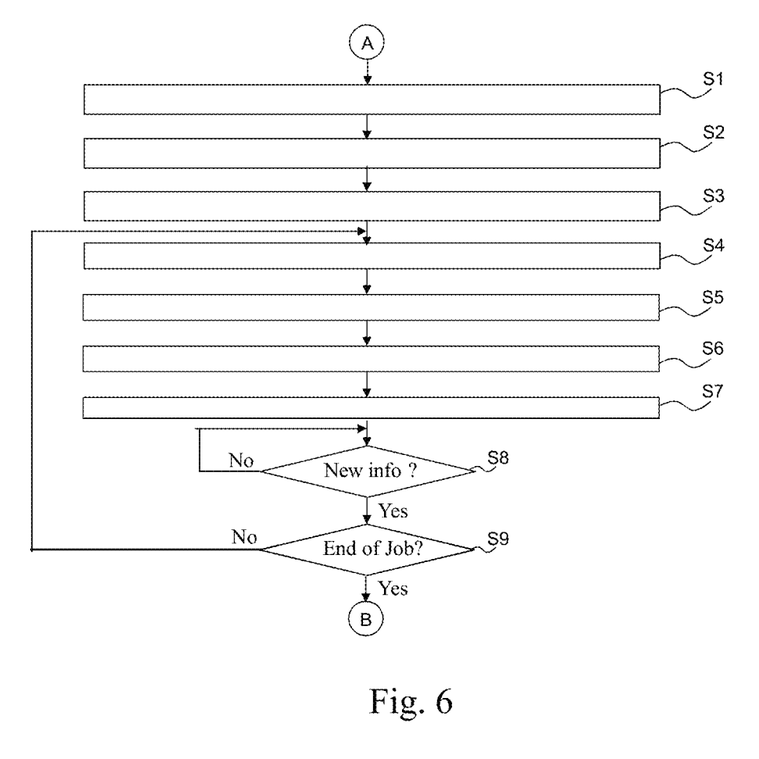

FIG. 6 illustrates an embodiment of the method according to the invention, wherein the steps S1-S7 are the same as in FIG. 5. For convenience reasons the text of the steps S1-S7 as shown in FIG. 5 have been omitted in FIG. 6.

In an additional eighth step S8, it is checked if new information about the second unknown part of the print job duration has been received by the controller. If not, the method returns to a point just before the eighth step S8. In other words, the eighth step S8 is repeated with a predetermined time interval until new information is received. If new information is received, the method proceeds to a ninth step S9.

In the additional ninth step S9, it is checked whether the end of the print job is encountered, i.e. the whole print job, all blocks of data, have been received.

If so, the method ends in end point B. It should be noted that the end point B does not have to mean that the printing of the print job also has to stop. It could be that the print buffer is still loaded with the last block of data, which still has to be printed by the printing system.

If no end of job has been encountered, the method returns to the fourth step S4 and the steps S4-S9 are repeated until the end of the print job is encountered.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for scheduling operator actions for a print job to be printed in a print-while-rip mode by a printing system, the printing system comprising a user interface and a controller configured to schedule the print job in time, wherein the print job has not yet been received completely by the printing system and has a plurality of known print job properties and missing information that are essential for an accurate print job duration calculation of the print job, the method comprising the steps of:

receiving the print job at least partially in a print buffer of the printing system;

determining a first part of the print job duration, the first part of the print job duration being guaranteed to be consumed based on the plurality of known print job properties of the print job and based on the at least partially received print job;

establishing a start time of the print job;

assuming at least one second part of the print job duration, the at least one second part of the print job duration being unknown due to the missing information;

establishing at least one operator action at the printing system during the at least one second part of the print job duration based on the first part of the print job duration;

displaying a time bar for the print job on the user interface, the time bar starting from the established start time and comprising a first time bar part corresponding to and proportional to the first part of the print job duration and at least one second time bar part corresponding to the at least one second part of the print job duration; and for each established operator action, displaying a digital object representing the operator action at the corresponding moment in time on the at least one second time bar part.

2. The method according to claim 1, further comprising the steps of:

receiving at least a part of the missing information;

adapting the assumed at least one second part of the print job duration; and adapting the display of the at least one second time bar part.

3. The method according to claim 2, wherein the step of receiving at least part of the missing information comprises the sub-steps of:

receiving a new part of the print job in the print buffer; and deriving at least part of the missing information from the received new part.

4. The method according to claim 1, wherein the missing information comprises at least one of a type of a consumable needed for the print job, including print media, marking material, finishing material, output destinations, a total number of pages of the print job, a total number of blocks of data of the print job and a total number of bytes of the print job.

5. The method according to claim 4, further comprising the steps of:

assuming a second part of the print job duration for each medium type used earlier in the print job; and for each medium used earlier in the print job, displaying on the user interface the same first time bar and another of the at least one second time bar part, the another of the at least one second time bar part corresponding to the assumed second part of the print job duration for the medium type used earlier in the print job.

6. The method according to claim 4, further comprising the steps of:

assuming a second part of the print job duration for each output destination used earlier in the print job; and for each output destination used earlier in the print job, displaying on the user interface the same first time bar and another of the at least one second time bar part, the another of the at least one second time bar part corresponding to the assumed second part of the print job duration for the output destination used earlier in the print job.

7. The method according to claim 4, further comprising the steps of:

assuming a second part of the print job duration for each medium type used in earlier printed print jobs; and for each medium used in earlier printed print jobs, displaying on the user interface the same first time bar and another of the at least one second time bar part, the another of the at least one second time bar part corresponding to the assumed second part of the print job duration for the medium type used in earlier printed print jobs.

8. The method according to claim 4, further comprising the steps of:

assuming another of the at least one second part of the print job duration for each medium type present in media input holders of the printing system; and for each medium type present in the media input holders, displaying on the user interface the same first time bar and another of the at least one second time bar part, the another one of the second time bar part corresponding to the assumed another of the at least one second part of the print job duration for the medium type present in media input holders of the printing system.

9. The method according to claim 1, wherein the step of assuming the at least one second part of the print job duration further comprises the step of assuming the at least one second part of the print job duration is equal to a time period that is equal to the greatest amount of the at least one second part of the print job duration that can be displayed on a window of the user interface.

10. The method according to claim 4, wherein the operator action is a refilling action for the consumable for the printing system, and the operator action representing a digital object is a digital object representing the refilling action.

11. The method according to claim 4, wherein the operator action is an emptying action to empty a consumable holder for the consumable of the printing system, and the operator action representing a digital object is a digital object representing the emptying action.

12. The method according to claim 1, wherein the print job is one out of a transactional print job, a streaming print job, a print-while-rip job and a rip-while-print job.

13. The method according to claim 1, wherein the first time bar part is visually distinguishable from the at least one second time bar part.

14. A printing system for printing a print job in a print-while-rip mode, the printing system comprising:

a user interface; and a controller for scheduling the print job in time, wherein the print job has not yet been received completely by the printing system and has a plurality of known print job properties and missing information that are essential for an accurate print job duration calculation of the print job, wherein the controller is configured to execute the steps of the method according to claim 1.

15. The printing system according to claim 14, wherein the controller of the printing system is configured to select a streaming printing mode.

16. A non-transitory computer readable medium comprising computer executable program code configured to instruct a computer to perform the method according to claim 1.

* * * * *